(12) United States Patent
Inoue et al.

(10) Patent No.: US 11,020,697 B2
(45) Date of Patent: Jun. 1, 2021

(54) OIL SEPARATOR

(71) Applicant: DAIKIN INDUSTRIES, LTD., Osaka (JP)

(72) Inventors: Takashi Inoue, Osaka (JP); Harunori Miyamura, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/651,318

(22) PCT Filed: Jul. 30, 2018

(86) PCT No.: PCT/JP2018/028363
§ 371 (c)(1),
(2) Date: Mar. 26, 2020

(87) PCT Pub. No.: WO2019/064882
PCT Pub. Date: Apr. 4, 2019

(65) Prior Publication Data
US 2020/0230535 A1 Jul. 23, 2020

(30) Foreign Application Priority Data

Sep. 29, 2017 (JP) .............................. JP2017-190266

(51) Int. Cl.
*B01D 45/12* (2006.01)
*B01D 45/16* (2006.01)
(Continued)

(52) U.S. Cl.
CPC ................ *B01D 45/16* (2013.01); *B04C 5/04* (2013.01); *B04C 5/081* (2013.01); *B04C 5/103* (2013.01);
(Continued)

(58) Field of Classification Search
CPC ...... B01D 45/16; F25B 43/02; F25B 2400/23; F25B 2400/02; F04B 39/04; B04C 5/04; B04C 5/081; B04C 5/103; B01J 8/0055
See application file for complete search history.

(56) References Cited

U.S. PATENT DOCUMENTS

| 1,344,146 A | * | 6/1920 | Peck ......................... B04C 1/00 |
| | | | 55/459.1 |
| 1,990,943 A | * | 2/1935 | Horne ..................... B04C 5/081 |
| | | | 55/349 |

(Continued)

FOREIGN PATENT DOCUMENTS

| CN | 1353249 A | 6/2002 |
| CN | 201200933 Y | 3/2009 |

(Continued)

OTHER PUBLICATIONS

International Search Report of corresponding PCT Application No. PCT/JP2018/028363 dated Sep. 18, 2018.

(Continued)

*Primary Examiner* — Dung H Bui
(74) *Attorney, Agent, or Firm* — Global IP Counselors, LLP

(57) ABSTRACT

A centrifugal-separation type oil separator includes a cylindrical separator body, and an inflow pipe arranged to introduce a fluid including an oil into the separator body. The inflow pipe includes a curved portion. A peripheral wall of the separator body and the inflow pipe include a common portion common to each other.

13 Claims, 13 Drawing Sheets

(51) Int. Cl.
  *B04C 5/04*   (2006.01)
  *F25B 43/02*  (2006.01)
  *B04C 5/081*  (2006.01)
  *B04C 5/103*  (2006.01)
  *F04B 39/04*  (2006.01)
  *B01J 8/00*   (2006.01)

(52) U.S. Cl.
  CPC ............ *F25B 43/02* (2013.01); *B01J 8/0055* (2013.01); *F04B 39/04* (2013.01); *F25B 2400/02* (2013.01); *F25B 2400/23* (2013.01)

(56) References Cited

U.S. PATENT DOCUMENTS

| | | | | |
|---|---|---|---|---|
| 2,033,471 A * | 3/1936 | Keenan | B04C 5/04 | 55/414 |
| 2,056,782 A * | 10/1936 | Fosdick | F16L 41/023 | 138/39 |
| 2,786,547 A * | 3/1957 | McCartney | B04C 5/04 | 55/459.5 |
| 2,837,172 A * | 6/1958 | Klein | D21D 5/18 | 55/345 |
| 3,129,173 A * | 4/1964 | Schulze | B04C 5/13 | 210/512.1 |
| 3,199,269 A * | 8/1965 | Oehlrich | B04C 9/00 | 96/372 |
| 3,850,816 A * | 11/1974 | Koch | B04C 5/04 | 210/512.1 |
| 3,898,068 A * | 8/1975 | McNeil | B01D 45/12 | 55/426 |
| 3,953,184 A * | 4/1976 | Stockford | B01D 45/12 | 55/458 |
| 4,212,653 A * | 7/1980 | Giles | B01D 45/16 | 209/716 |
| 4,216,095 A * | 8/1980 | Ruff | B03B 5/34 | 209/724 |
| 4,519,822 A * | 5/1985 | Hatano | B04C 5/081 | 55/459.1 |
| 4,572,727 A * | 2/1986 | Masayuki | B04C 5/081 | 209/719 |
| 4,600,410 A * | 7/1986 | Baillie | B04C 5/103 | 209/471 |
| 4,687,492 A * | 8/1987 | Walters | B01J 8/0055 | 422/147 |
| 4,848,993 A * | 7/1989 | Elkjaer | B04C 5/02 | 55/459.1 |
| 5,159,820 A * | 11/1992 | Ohishi | B01D 45/12 | 210/167.02 |
| 5,238,475 A * | 8/1993 | Keuschnigg | B01D 45/16 | 55/349 |
| 5,370,844 A * | 12/1994 | Peterson | B01J 8/0055 | 422/147 |
| 5,518,695 A * | 5/1996 | Goodspeed | B01J 8/0055 | 208/153 |
| 6,926,749 B1 * | 8/2005 | Tenney | B01D 45/16 | 210/512.1 |
| 6,979,360 B1 * | 12/2005 | Cetinkaya | B01D 45/16 | 208/153 |
| 8,104,622 B2 * | 1/2012 | Soto | B04C 5/13 | 209/732 |
| D731,135 S * | 6/2015 | Small | D32/31 | |
| 2002/0054823 A1 | 5/2002 | Hida et al. | | |
| 2003/0200736 A1 * | 10/2003 | Ni | B04C 5/181 | 55/426 |
| 2006/0280622 A1 | 12/2006 | Lee et al. | | |
| 2009/0133370 A1 * | 5/2009 | Yoo | A47L 9/1666 | 55/429 |
| 2011/0247500 A1 * | 10/2011 | Akhras | B01D 19/0094 | 96/182 |
| 2012/0055125 A1 * | 3/2012 | Manska | A47L 7/0071 | 55/394 |
| 2012/0180518 A1 | 7/2012 | Yukimoto | | |
| 2012/0180662 A1 * | 7/2012 | Missalla | B04C 5/13 | 95/271 |
| 2013/0239816 A1 * | 9/2013 | Mantilla | B04C 5/14 | 96/182 |
| 2016/0313038 A1 | 10/2016 | Young et al. | | |
| 2018/0154375 A1 * | 6/2018 | Lamare | B04C 5/04 | |
| 2019/0022585 A1 * | 1/2019 | Patrick | B04C 5/181 | |

FOREIGN PATENT DOCUMENTS

| | | |
|---|---|---|
| CN | 101428254 A | 5/2009 |
| CN | 102549357 A | 7/2012 |
| CN | 104971830 A | 10/2015 |
| JP | 47-2949 B1 | 1/1972 |
| JP | 05104032 A * | 4/1993 ............ B01J 8/0055 |
| JP | 11-248296 A | 9/1999 |
| JP | 2000-170681 A | 6/2000 |
| JP | 2002-70778 A | 3/2002 |
| JP | 2004-52710 A | 2/2004 |
| JP | 2004-77033 A | 3/2004 |
| JP | 2006-144660 A | 6/2006 |
| JP | 2006-305525 A | 11/2006 |
| JP | 2008-291655 A | 12/2008 |
| JP | 2011-185597 A | 9/2011 |
| JP | 2012-32109 A | 2/2012 |
| JP | 2014-161839 A | 9/2014 |
| JP | 20150232434 A | 12/2015 |
| JP | 2017-503989 A | 2/2017 |
| KR | 20130032682 A | 4/2013 |

OTHER PUBLICATIONS

International Preliminary Report of corresponding PCT Application No. PCT/JP2018/028363 dated Mar. 31, 2020.
European Search Report of corresponding EP Application No. 18 86 0195.9 dated Apr. 6, 2021.

* cited by examiner

OIL SEPARATOR

CROSS-REFERENCE TO RELATED APPLICATIONS

This U.S. National stage application claims priority under 35 U.S.C. § 119(a) to Japanese Patent Application No. 2017-190266, filed in Japan on Sep. 29, 2017, the entire contents of which are hereby incorporated herein by reference.

BACKGROUND

Field of the Invention

The present invention relates to an oil separator of a centrifugal-separation type.

Background Art Background Information

The oil separator disclosed in Japanese Unexamined Patent Application Publication No. 2017-503989 includes an inflow pipe including a curved portion, In the curved portion, an oil in a fluid is separated by a centrifugal force. Then, the fluid flows into a separator body. In the separator body, the oil in the fluid is further separated by a centrifugal force generated by a swirling flow (refer to FIG. 3 in Japanese Unexamined Patent Application Publication No. 2017-503989, for example).

SUMMARY

When an inflow pipe includes a curved portion, a space in which an oil separator is to be installed increases.

An object of the present invention is to reduce the size of an oil separator including a curved portion in an inflow pipe.

According to a first aspect, an oil separator of a centrifugal-separation type includes a cylindrical separator body (70) and an inflow pipe (50) that introduces a fluid including an oil into the separator body (70) and that includes a curved portion (60). A peripheral wall (71) of the separator body (70) and the inflow pipe (50) include a common portion (C) common to each other.

In the first aspect, the separator body (70) and the inflow pipe (50) include the common portion (C), and it is thus possible to reduce the size of an oil separator (40).

According to a second aspect, in the oil separator of the first aspect, the common portion (C) is disposed in the curved portion (60) of the inflow pipe (50).

In the second aspect, due to the common portion (C) disposed in the curved portion (60) having a comparatively large installation space, it is possible to reduce the size of the oil separator (40).

According to a third aspect, in the oil separator of second aspect, the curved portion (60) includes a first wall (61) as the common portion (C), the first wall (61) being substantially flush with the peripheral wall (71) of the separator body (70).

In the third aspect, the shape of the peripheral wall (71) of the separator body (70) is simplified.

According to a fourth aspect, in the oil separator of the third aspect, a shape of a cross section of an inner surface (61a) of the first wall (61), the cross section being at right angles to an axis of the inflow pipe (50), is flat.

In the fourth aspect, it is possible to increase the cross-sectional area of the passage of the curved portion (60), and it is thus possible to decrease the pipe diameter (diameter) of the curved portion (60).

According to a fifth aspect, in the oil separator of any one of the second to fourth aspects, the curved portion (60) includes a second wall (62) protruding from the peripheral wall (71) of the separator body (70) toward an outer side in a radial direction.

In the fifth aspect, the surface area of the curved portion (60) exposed to the outside is increased.

According to a sixth aspect, in the oil separator of any one of the second to fifth aspects, the curved portion (60) includes a third wall (66) protruding from the peripheral wall (71) of the separator body (70) toward an inner side in a radial direction.

In the sixth aspect, a portion of the curved portion (60) is positioned inside the separator body (70). It is thus possible to reduce the size of the curved portion (60) as a whole in the radial direction.

According to a seventh aspect, in the oil separator of any one of the second to sixth aspects, an axis L1 of an inflow port (51a) of the inflow pipe (50) is offset from a tangent L2 of an outer circumferential surface of the separator body (70) toward a center of the separator body (70).

In the seventh aspect, it is possible to increase the total length of the curved portion (60) while reducing the total size of the oil separator (40).

According to an eighth aspect, in the oil separator of any one of the first to seventh aspects, the separator body (70) and the inflow pipe (50) constitute an integral structure made of a cast.

In the eighth aspect, it is possible to easily mold an integral structure including the common portion (C).

According to a ninth aspect, in the oil separator of any one of the first to eighth aspects, the curved portion (60) has the inner surface (61a) having a shape tapered toward an outer side in a radial direction.

In the ninth aspect, an oil separated by utilizing a centrifugal force is enabled to be collected at the inner surface (61a) of the curved portion (60).

According to a tenth aspect, in the oil separator of any one of the first to ninth aspects, the curved portion (60) includes an oil draining hole (90).

In the tenth aspect, the oil in the curved portion (60) is enabled to be discharged to the outside of the curved portion (60) through the oil draining hole (90).

According to an eleventh aspect, in the oil separator of the tenth aspect, the oil separator further includes a passage member (91) forming an oil passage (92) in communication with the oil draining hole (90). The passage member (91) has a structure integral with at least one of the curved portion (60) and the separator body (70).

In the eleventh aspect, it is possible to reduce the size of the oil separator including the passage member (91).

According to a twelfth aspect, a compressor includes a compression mechanism (30) that compresses a fluid and the oil separator (40) of any one of the first to eleventh aspects, the oil separator (40) being targeted at a fluid discharged from the compression mechanism (30).

In the twelfth aspect, it is possible to reduce the size of the compressor including the oil separator (40).

According to a thirteenth aspect, in the compressor of the twelfth aspect, the compressor further includes a casing (11) that accommodates the compression mechanism (30). The oil separator (40) constitutes a portion of the casing (11).

In the thirteenth aspect, it is possible to reduce the size of the compressor.

DETAILED DESCRIPTION OF EMBODIMENTS

Hereinafter, embodiments of the present invention will be described with reference to the drawings. The following embodiments are fundamentally presented as preferable examples and do not intend to limit the present invention, application thereof, or the range of the intended use thereof. Configurations in the embodiments, modifications, the other examples, and the like described below can be combined to each other or some of them can be replaced within the range in which the present invention can be embodied.

EMBODIMENTS

An oil separator (40) according to an embodiment s also used for a compressor (10). The compressor (10) is connected to a refrigerant circuit of a refrigeration apparatus. In the refrigerant circuit, a refrigerant compressed in the compressor (10) circulates, and a refrigeration cycle is thereby performed.

Figure 1:
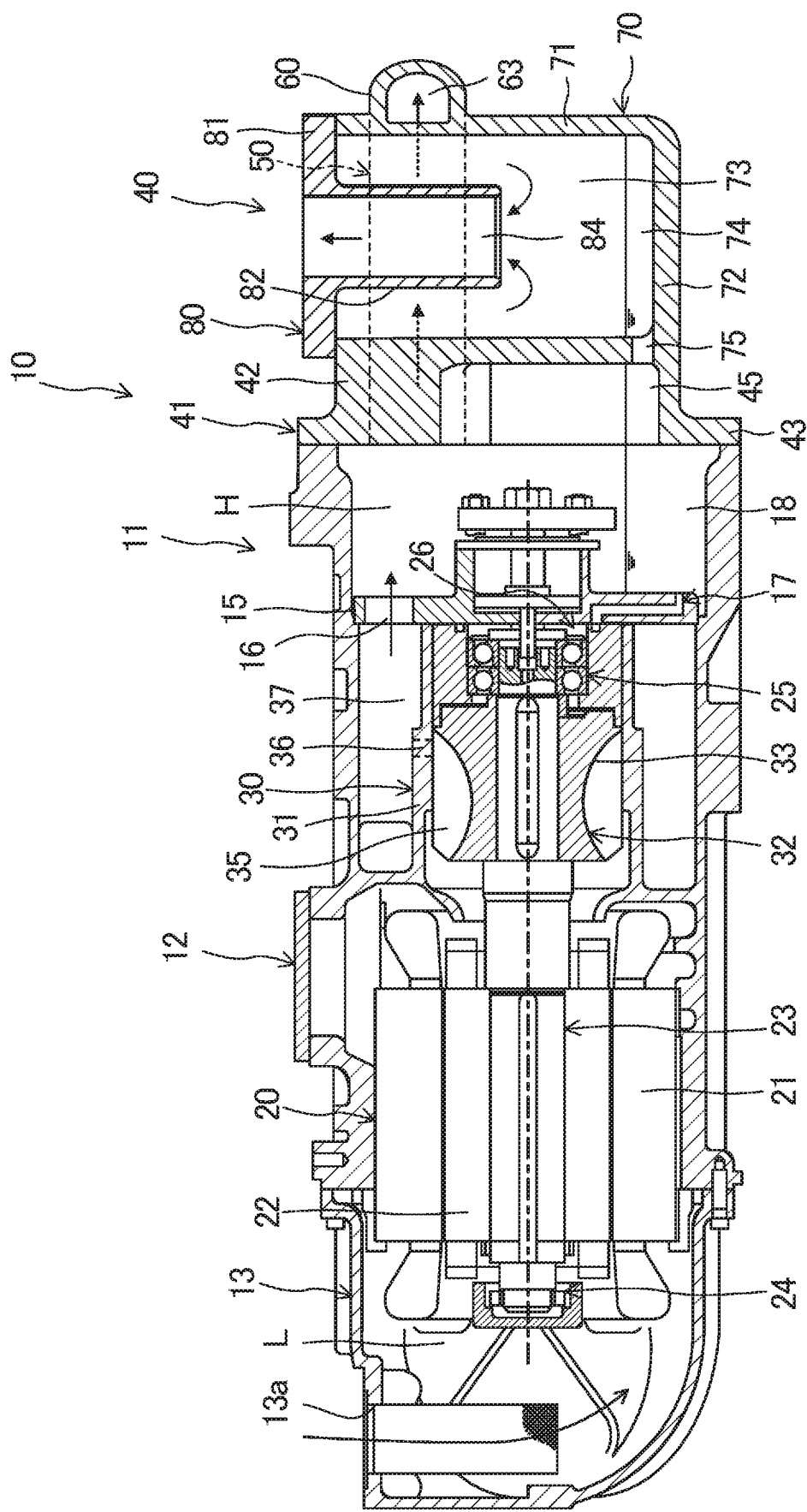
FIG. 1 is a longitudinal sectional view illustrating the overall configuration of a compressor according to an embodiment.

The compressor (10) illustrated in FIG. 1 is a single-screw compressor. The compressor (10) includes a casing (11), an electric motor (20) in the casing (11), a drive shaft (23), and a compression mechanism (30). The compressor (10) includes the oil separator (40). The oil separator (40) is also used as a portion of the casing (11).

<Casing>

The casing (11) is constituted by a laterally elongated metallic semi-hermetic container. The casing (11) includes a casing body (12), an intake cover (13), and a discharge cover (41). The casing body (12) has a laterally elongated cylindrical shape. The intake cover (13) closes an opening at one end in the longitudinal direction (axial direction) of the casing body (12). The discharge cover (41) closes an opening at the other end in the longitudinal direction of the body. Inside the casing (11), a low-pressure space (L) is formed closer to the intake cover (13), and a high-pressure space (H) is formed closer to the discharge cover (41).

An upper portion of the intake cover (13) includes an intake port (13a). An intake pipe (not illustrated) is connected to the intake port (13a). The intake pipe is connected to the refrigerant circuit. A low-pressure refrigerant is introduced from the intake pipe into the low-pressure space (L) inside the casing (11). The discharge cover (41) is also used for the oil separator (40). Details of the discharge cover (41) will be described later.

<Electric Motor>

The electric motor (20) is disposed in the low-pressure space (L). The electric motor (20) includes a stator (21) fixed to the casing body (12) and a rotor (22) disposed inside the stator (21). The drive shaft (23) is fixed to a center portion of the rotor (22). The electric motor (20) is configured to be variable in terms of the number of rotations or capacity. In other words, the electric motor (20) is of an inverter type in which electric power is supplied via an inverter device.

<Drive Shaft>

The drive shaft (23) is coupled to the electric motor (20) and the compression mechanisms (30). The drive shaft (23) extends horizontally in the longitudinal direction of the casing (11). The drive shaft (23) is rotatably supported by a first bearing (24) and a second bearing (25). The first bearing (24) is disposed inside the intake cover (13). The second bearing (25) is disposed in a bearing chamber (26). The bearing chamber (26) is disposed at the center inside the casing body (12).

<Compression Mechanism>

The compression mechanism (30) is driven by the electric motor (20) via the drive shaft (23). In the compression mechanism (30), a refrigerant is compressed. The compression mechanism (30) includes a cylinder portion (31), a screw rotor (32), and two gate rotors (not illustrated). The cylinder portion (31) is disposed at the center inside the casing body (12). Inside the cylinder portion (31), a slide valve (not illustrated) for performing an unload operation (operation for returning a portion of the compressed refrigerant into the low-pressure space (L)) is disposed. The screw rotor (32) is accommodated inside the cylinder portion (31). The screw rotor (32) is driven to rotate by the drive shaft (23). The screw rotor (32) includes a helical groove (33) on the circumference thereof. The helical groove (33) meshes with a plurality of gates of the gate rotors. Consequently, a compression chamber (35) is formed between the cylinder portion (31), the screw rotor (32), and the gates. The refrigerant compressed in the compression chamber (35) is discharged through a discharge port (36) into a discharge passage (37) around the cylinder portion (31).

<Partition Wall>

A disc-shaped partition portion (15) is formed between the compression mechanism (30) and the high-pressure space (H). The outer circumferential surface of the partition portion (15) is fixed to the inner circumferential surface of the casing body (12). The partition portion (15) includes a discharge communication hole (16) that enables the discharge passage (37) and the high-pressure space (H) to be in communication with each other. The refrigerant in the discharge passage (37) is sent into the high-pressure space (H) by passing through the discharge communication hole (16).

The partition portion (15) includes an oil introduction path (17). The oil introduction path (17) enables a first oil reservoir (18) in a lower portion of the high-pressure space (H) and the hearing chamber (26) to be in communication with each other.

<Overall Configuration of Oil Separator>

Next, the configuration of the oil separator (40) will be described in detail with reference to FIG. 1 to FIG. 8. The oil separator (40) separates an oil from the refrigerant in the high-pressure space (H). The oil separator (40) is a centrifugal-separation type that utilizes a centrifugal force to separate an oil. Strictly, the oil separator (40) is of a cyclone-type that utilizes a swirling flow generated between an outer cylinder (71) and an inner cylinder (82) to separate an oil in a refrigerant.

The oil separator (40) includes the discharge cover (41), an inflow pipe (50), a separator body (70), and an inner member (80). The discharge cover (41) is also used as a portion of the aforementioned casing (11). The inflow pipe (50) introduces the high-pressure refrigerant in the high-pressure space (H) into the separator body (70). The separator body (70) has a bottomed cylindrical shape. The peripheral wall of the separator body (70) constitutes the outer cylinder (71). The inner member (80) is attached to an upper portion of the separator body (70). The inner member (80) includes a top plate (81) that closes the upper side of the separator body (70) and the inner cylinder (82) disposed inside the separator body (70).

<Discharge Cover>

Figure 2:
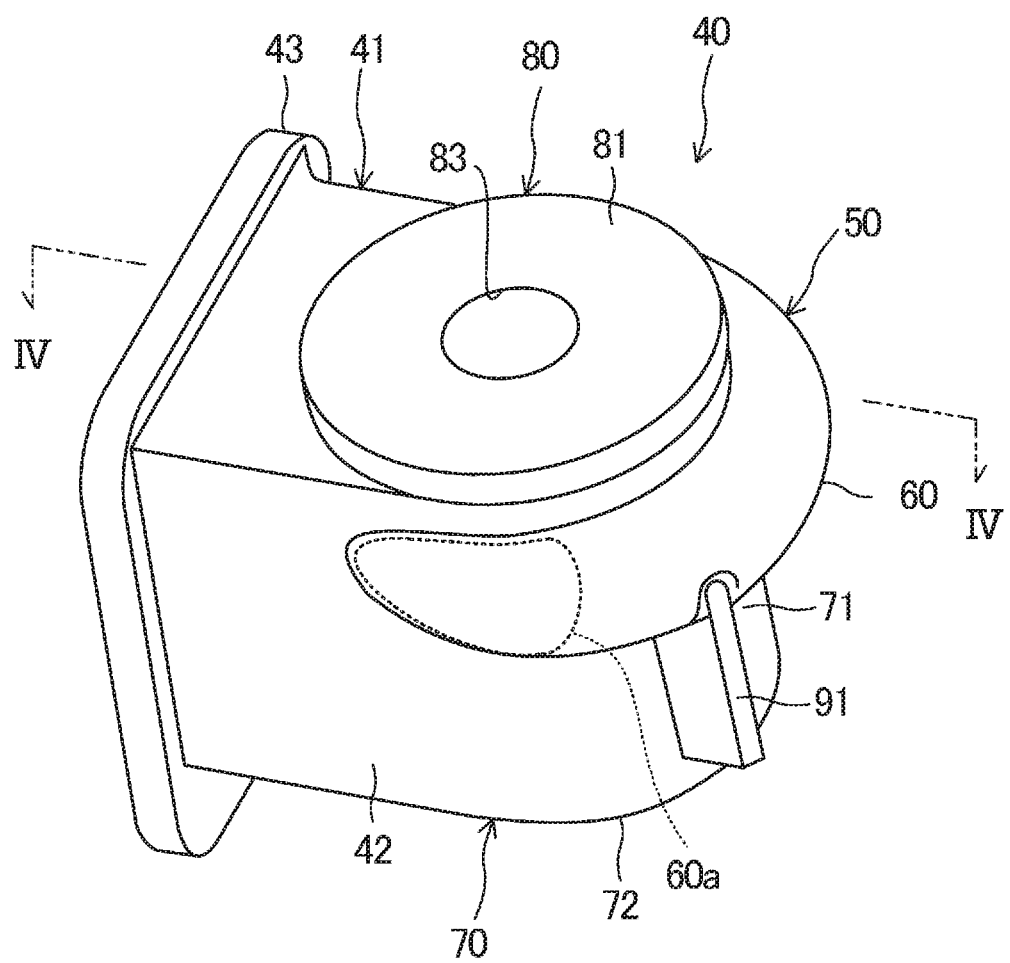
FIG. 2 is a perspective view of an oil separator viewed from the side.
Figure 3:
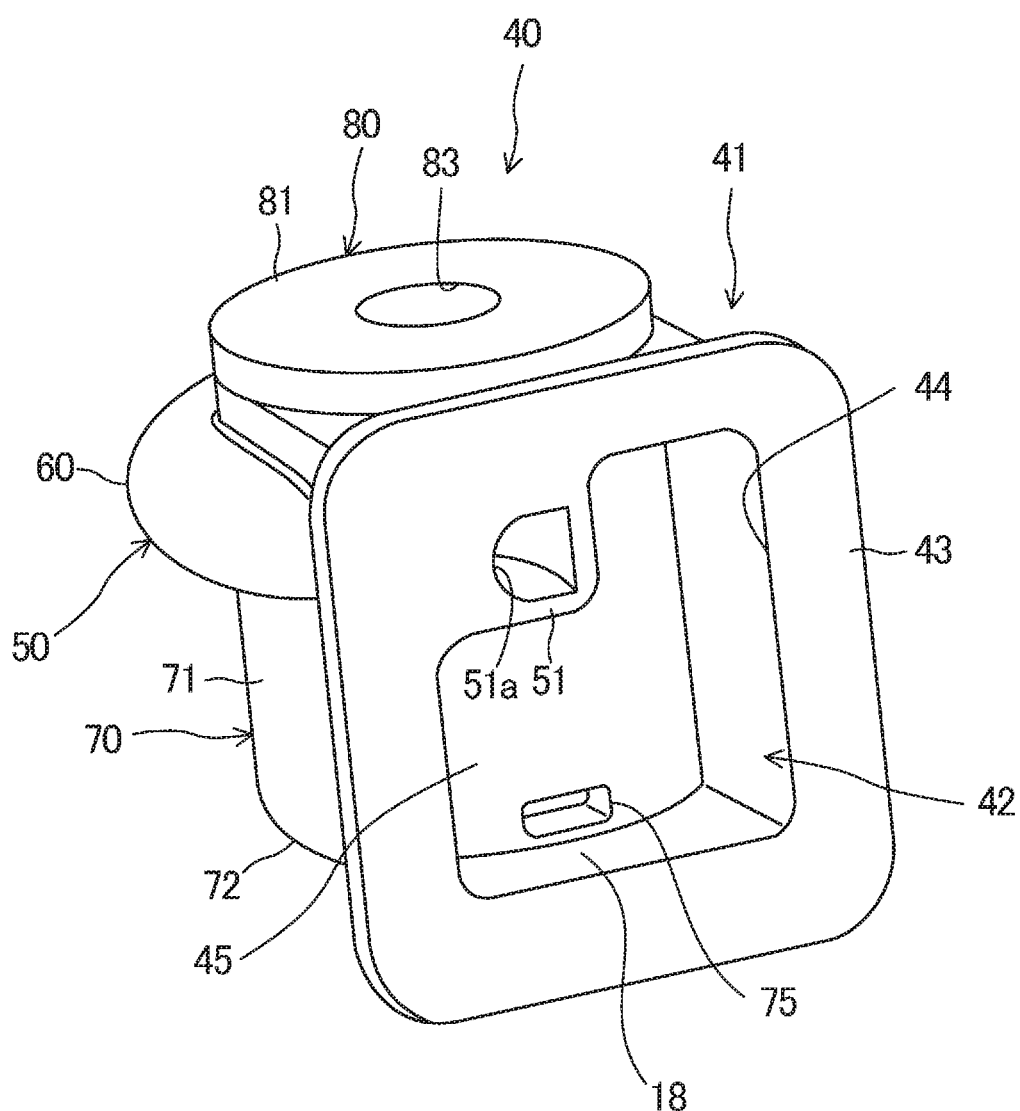
FIG. 3 is a perspective view of the oil separator viewed from a flange-side.

As illustrated in FIG. 2 and FIG. 3, the discharge cover (41) includes a discharge cover body (42) and a flange (43). The discharge cover body (42) has a polygonal-cylinder shape. The discharge cover body (42) includes a cover opening (44) in a side surface thereof facing the casing body (12). A first inner space (45) for separating an oil is formed inside the discharge cover body (42). The first inner space (45) constitutes a portion of the high-pressure space (H). In other words, the first inner space (45) constitutes a portion of the first oil reservoir (18).

The flange (43) projects from the outer edge of the cover opening (44) toward the outer side in the radial direction. The flange (43) has a rectangular-frame shape. The flange (43) is coupled to the casing body (12) via a fastening member (not illustrated). Consequently, the casing body (12) is closed by the discharge cover (41), and the casing (11) is thereby integrally constituted.

<Inflow Pipe>

The inflow pipe (50) is disposed in an upper portion of the separator body (70). More strictly, the height position of the inflow pipe (50) is higher than the lower end of the inner cylinder (82) (refer to FIG. 4). The inflow pipe (50) includes a straight portion (51) and a curved portion (60). The straight portion (51) is formed on the upstream side of the inflow pipe (50), and the curved portion (60) is formed on the downstream side of the inflow pipe (50).

As illustrated in FIG. 3, the straight portion (51) is positioned inside the discharge cover body (42). The straight portion (51) extends horizontally along the axial center of the casing (11). An inflow end (that is, an inflow port (51*a*) of the inflow pipe (50)) of the straight portion (51) faces the high-pressure space (H). The inflow port (51*a*) is substantially flush with an end surface of the flange (43).

The curved portion (60) has a function of separating an oil in a refrigerant that has flowed into the inflow pipe (50) by utilizing a centrifugal force. The curved portion (60) of the present embodiment is formed outside the separator body (70). The starting end of the curved portion (60) is continuous with the straight portion (51). The curved portion (60) is curved about the axis of the separator body (70). More strictly, the curved portion (60) is curved from the upstream portion toward the downstream portion thereof in a direction identical to the rotation direction of a swirling flow inside the separator body (70). The curved portion (60) is curved to extend along the outer cylinder (71) of the separator body (70) or to surround the outer cylinder (71). The curved portion (60) is curved to surround the outer cylinder (71) of the separator body (70).

Figure 5:
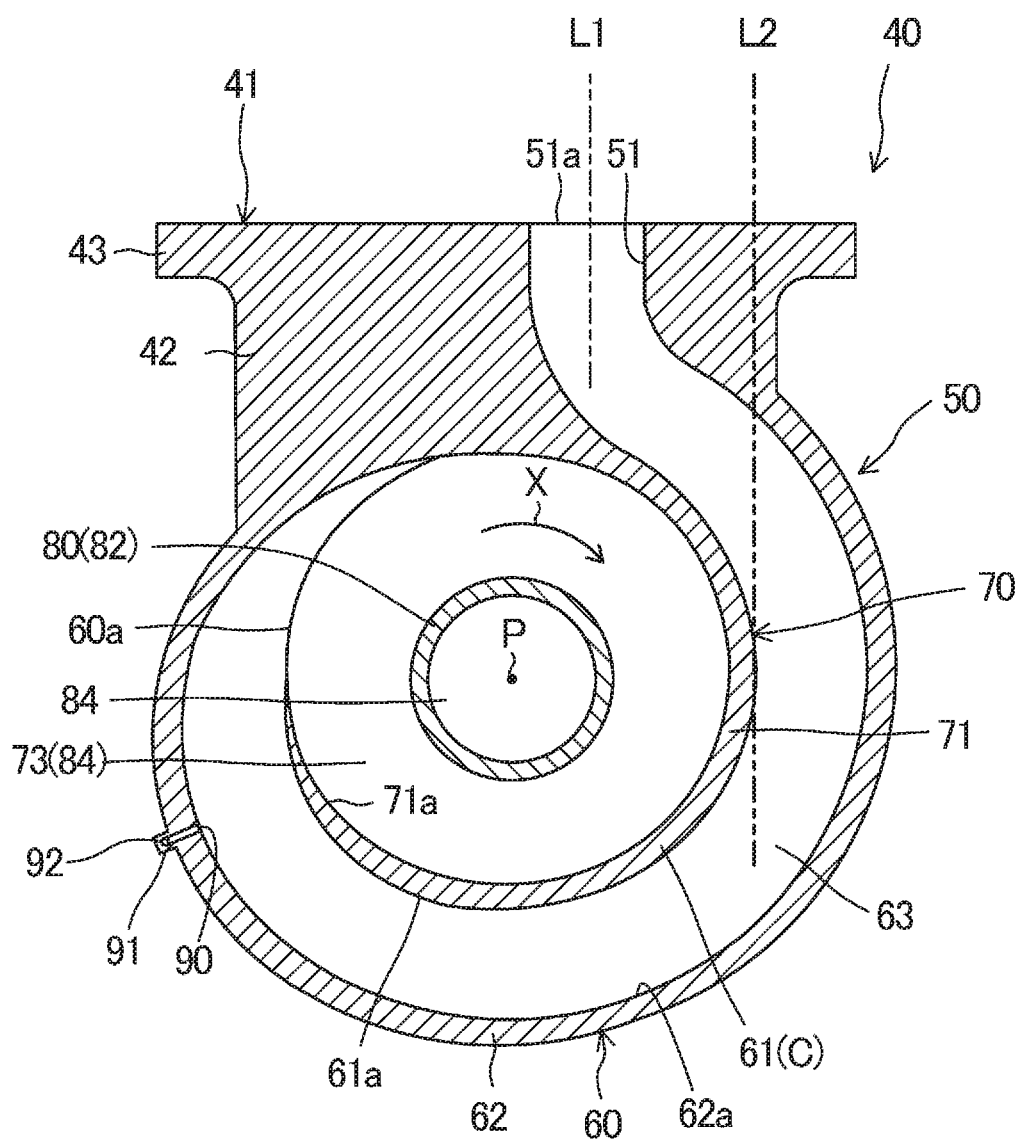
FIG. 5 is a sectional view taken along line V-V of FIG. 4.

As illustrated in FIG. 5, an outflow end (60*a*) of the curved portion (60) opens in a second inner space (73) of the separator body (70). The outflow end (60*a*) of the curved portion (60) is directed in a direction along a tangent of the inner circumferential surface of the outer cylinder (71).

As illustrated in FIG. 5, an axis (L1) of the inflow port (51*a*) of the inflow pipe (50) is offset from a tangent (L2) of the outer circumferential surface of the outer cylinder (71) of the separator body (70) toward a center (P) of the separator body (70).

<Separator Body>

The separator body (70) utilizes a centrifugal force generated by a swirling flow of a refrigerant to separate an oil in the refrigerant. The separator body (70) is a vertically elongated bottomed cylindrical container that opens on the upper side. The separator body (70) includes the aforementioned outer cylinder (71) and a disc-shaped bottom plate (72) (bottom portion) that closes the lower side of the outer cylinder (71). The second inner space (73) is formed inside the separator body (70). A second oil reservoir (74) that stores a separated oil is formed in a lower portion of the second inner space (73).

An oil outlet (75) is formed in a lower end portion of the outer cylinder (71). The oil outlet (75) enables the second inner space (73) (second oil reservoir (74)) and the first inner space first oil reservoir (18)) to be in communication with each other. Consequently, the oil in the second oil reservoir (74) is enabled to be sent into the first oil reservoir (18) through the oil outlet (75).

<Inner Member>

The inner member (80) includes the aforementioned top plate (81) and the inner cylinder (82).

The top plate (81) has a disc-shape with a circular opening (83) passing therethrough in a plate thickness direction (vertical direction). The outer diameter of the top plate (81) is larger than the inner diameter of the separator body (70). The outer peripheral edge portion of the top plate (81) is fixed to the upper end of the separator body (70). A refrigerant pipe (discharge pipe) of the refrigerant circuit is connected to the circular opening (83) of the top plate (81).

The inner cylinder (82) has a cylindrical shape extending downward from the inner edge of the circular opening (83) of the top plate (81). The inner cylinder (82) is disposed coaxially with the outer cylinder (71). Consequently, a cylindrical space in which a refrigerant swirls about the axis (in the direction indicated by arrow X in FIG. 5) is formed between the inner cylinder (82) and the outer cylinder (71). An inner passage (84) in which a refrigerant flows upward is formed inside the inner cylinder (82). An inflow port (an inner-cylinder inflow port (85)) in communication with the second inner space (73) is formed at the inflow end (lower end) of the inner passage (84). The outflow end (upper end) of the inner passage (84) is in communication with the circular opening (83).

<Details of Curved Portion>

The detailed configuration of the curved portion (60) of the inflow pipe (50) will be described.

Figure 6:
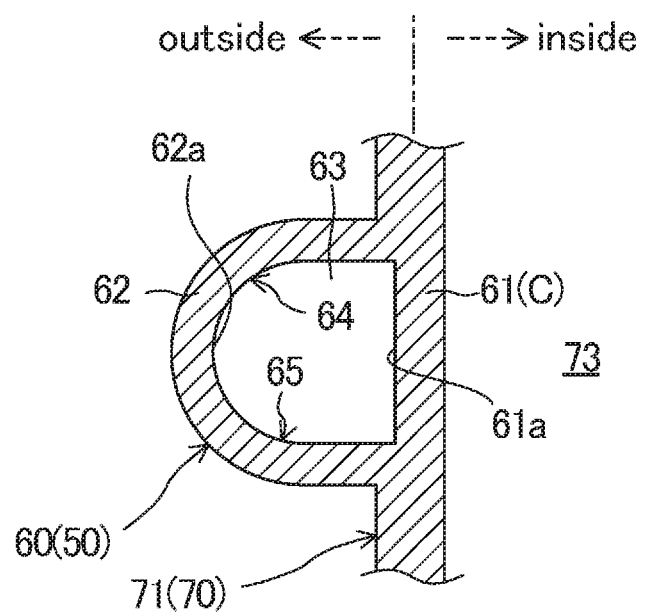
FIG. 6 is a cross sectional view at right angles to the pipe axis of a curved portion.

As illustrated in FIG. 5 and FIG. 6, the curved portion (60) includes a first wall (61) and a second wall (62). The first wall (61) is positioned close to the inner side (close to the separator body (70)), and the second wall (62) is positioned close to the outer side.

The first wall (61) is substantially flush with the outer cylinder (71) of the separator body (70). The first wall (61) and an inner surface (61a) thereof have a flat shape extending vertically in a cross sectional view at right angles to the pipe axis of the inflow pipe (50). The first wall (61) has a substantially arc shape in a cross sectional view at right angles to the pipe axis of the separator body (70). The first wall (61) extends over a range of approximately 180° or more with the axial center of the separator body (70) as a reference.

The first wall (61) is also used as a portion of the outer cylinder (71). Specifically, the peripheral wall (outer cylinder (71)) of the separator body (70) and the first wall (61) of the curved portion (60) constitute a common portion (C). In other words, the first wall (61) constitutes a partition wall between a passage (63) in the curved portion (60) and an inner space (second inner space (73)) of the separator body (70).

The second wall (62) protrudes from the outer cylinder (71) or the first wall (61) toward the outer side in the radial direction. The second wall (62) has a U-shape opening toward the outer cylinder (71) in the cross sectional view at right angles to the pipe axis of the inflow pipe (50). The second wall (62) has a substantially arc shape in the cross sectional view at right angles to the pipe axis of the separator body (70). The second wall (62) extends over a region of approximately 180° or more with the axial center of the separator body (70) as a reference.

The second wall (62) is a non-common portion not common with the separator body (70). The second wall (62) is positioned outside the separator body (70). Therefore, the second wall (62) constitutes an exposed portion exposed to the outside (atmospheric temperature atmosphere).

As illustrated in FIG. 5, the inner surface of the second wall (62) and the inner surface of the outer cylinder (71) are smoothly continuous with each other. In other words, in a cross sectional shape at right angles to the pipe axis of the separator body (70), the second wall (62) and the outer cylinder (71) constitute helical inner walls smoothly continuous with each other. The helical inner walls are wound from the outer end toward the inner end thereof in a direction identical to the direction of the swirling flow of a refrigerant.

<Oil Draining Hole>

Figure 7:
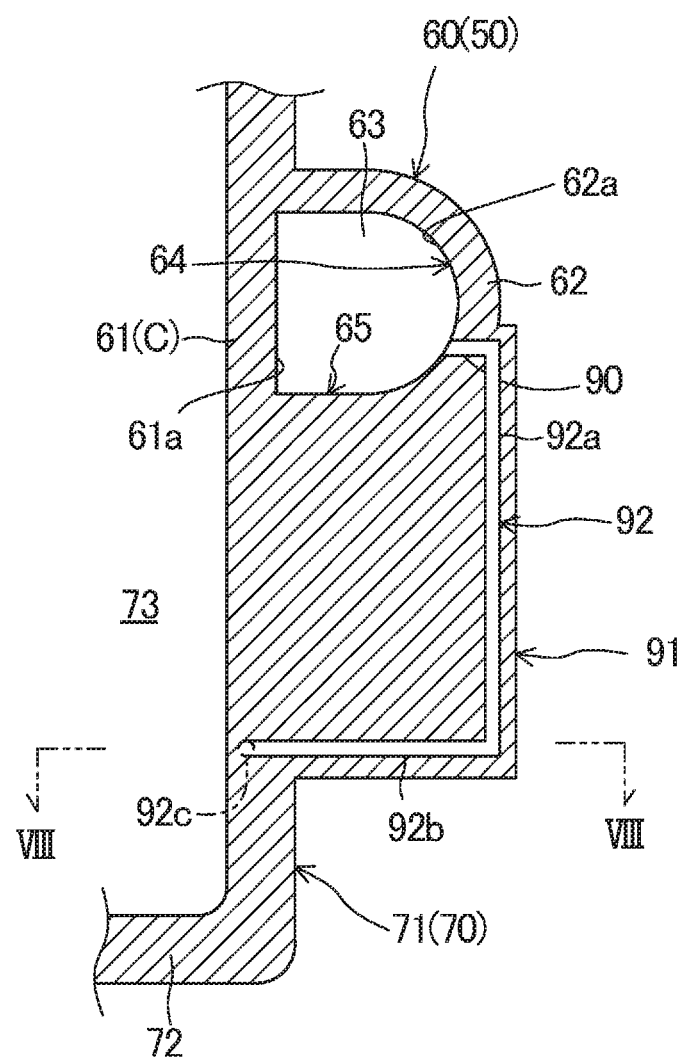
FIG. 7 is an enlarged longitudinal sectional view of a passage member and the periphery thereof.

As illustrated in FIG. 7, the curved portion (60) includes an oil draining hole (90) for discharging an oil accumulated in the passage (63) inside the curved portion (60) to the outside of the curved portion (60). The shape of a cross-section of a flow path of the oil draining hole (90) is, for example, circular. The oil draining hole (90) is formed in an outer circumferential portion (64) of the curved portion (60). Here, the outer circumferential portion (64) is, of the pipe wall of the curved portion (60), a portion facing the axial center of the separator body (70). As illustrated in FIG. 7, the oil draining hole (90) is formed in a lower-side portion (65) of the curved portion (60). Here, the lower-side portion (65) is, of the pipe wall of the curved portion (60), a portion lower the axial center (a height position at an intermediate portion in the vertical direction) of the passage (63) in the curved portion (60). The oil draining hole (90) is disposed, in the curved portion (60), close to the downstream end thereof. The oil draining hole (90) opens in a normal direction to be directed to the center of the curvature of the inner circumferential surface of the curved portion (60). The oil draining hole (90) of the present embodiment is constituted by one oil draining hole but may be constituted by two or more oil draining holes.

<Communication Member>

Figure 8:
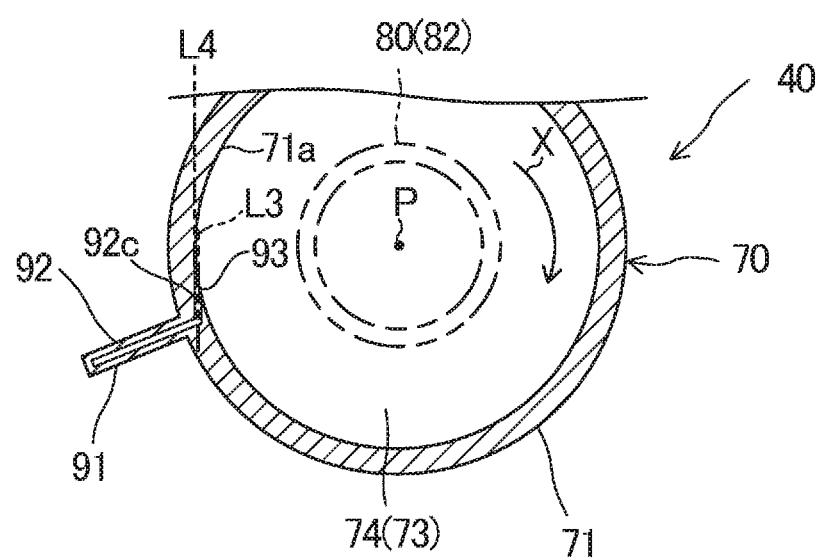
FIG. 8 is a sectional view taken along line of FIG. 7.

As illustrated in FIG. 2 and FIG. 7, a passage member (91) is disposed at a position corresponding to the oil draining hole (90). The passage member (91) has a vertically elongated parallelepiped or a flat-plate shape. An oil passage (92) continuous with the oil draining hole (90) is formed inside the passage member (91). The oil passage (92) enables the oil draining hole (90) of the curved portion (60) and the second inner space (second oil reservoir (74)) of the separator body (70) to be in communication with each other. The oil passage (92) includes a vertically elongated vertical passage (92a), a laterally elongated lateral passage (92b) connected to the lower end of the vertical passage (92a), and an outflow passage (92c) connected to the radial-direction inner end of the lateral passage (92b). As illustrated in FIG. 8, an outflow opening (93) of the oil passage (92) is formed in the outer cylinder (71) of the separator body (70). More specifically, the outflow opening (93) of the oil passage (92) is positioned on the lower side of the inner-cylinder inflow port (85) and on the outer side of the inner-cylinder inflow port (85). An axis (L3) of the outflow opening (93) of the oil passage (92) is directed in a direction along a tangent (L4) of an inner circumferential surface (71a) of the outer cylinder (71). In other words, in the present embodiment, the axis (L3) of the outflow opening (93) is substantially coincident with the tangent (L4) (strictly, the tangent at a location where the outflow opening (93) is formed) of the inner circumferential surface (71a) of the outer cylinder (71).

<Integral Structure of Oil Separator>

In the oil separator (40), the discharge cover (41), the inflow pipe (50), the separator body (70), and the passage member (91) are integrally molded by casting. In other words, the discharge cover (41), the inflow pipe (50), the separator body (70), and the passage member (91) constitute a first unit having an integral structure made of a cast. The inner member (80) is constituted by a second unit that is a different member from the first unit.

—Operation of Oil Separator—

As illustrated in FIG. 1, during operation of the compressor (10), a refrigerant after being compressed in the compression chamber (35) flows into the inflow pipe (50) from the high-pressure space (H). The refrigerant flows in the curved portion (60) after passing through the straight portion (51). In the curved portion (60), the refrigerant swirls along the curved portion (60). Consequently, small oil droplets in the refrigerant are separated by a centrifugal force.

Figure 4:
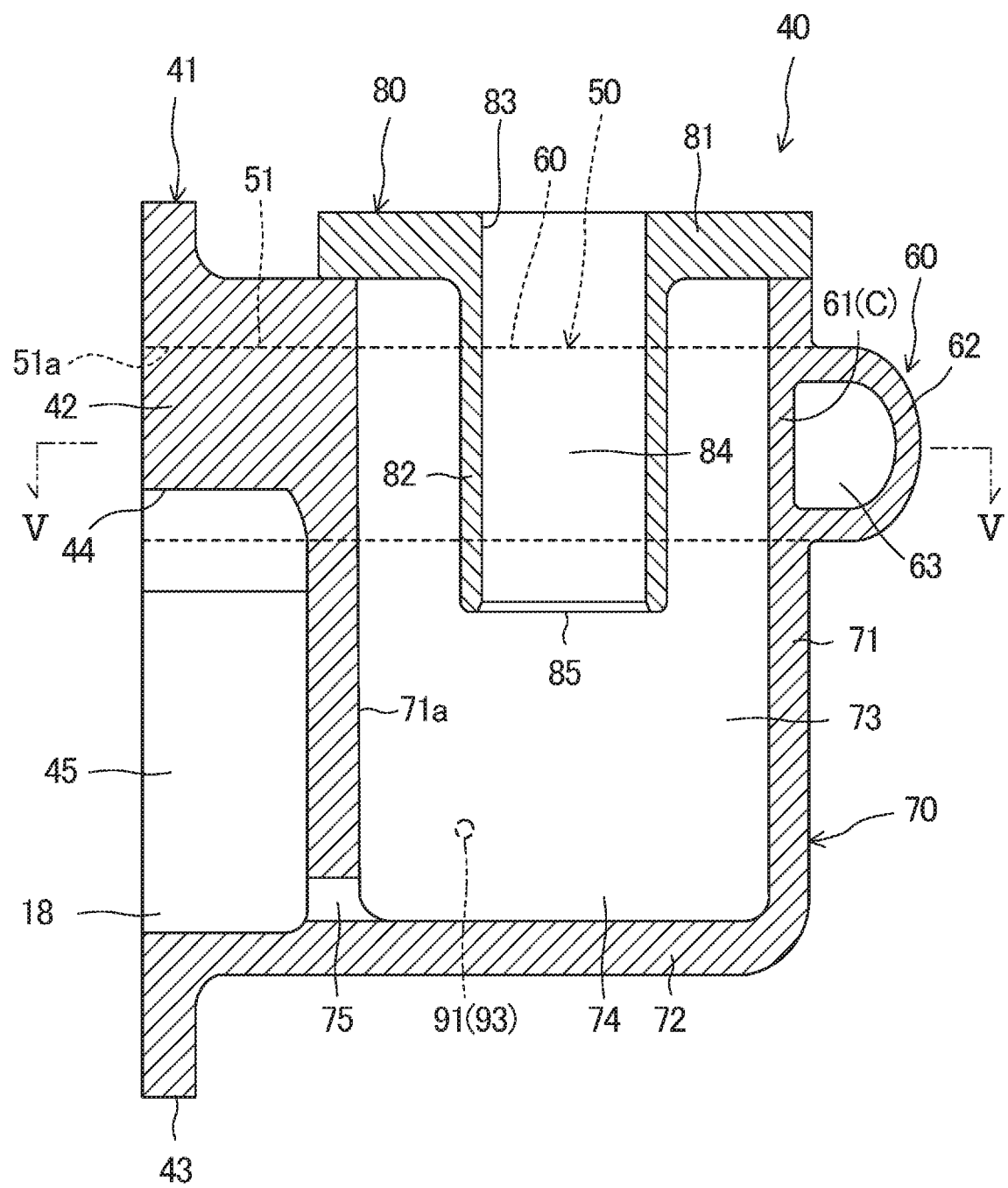
FIG. 4 is an enlarged longitudinal sectional view of the oil separator in FIG. 1.

Here, as illustrated in FIG. 4 and FIG. 6, in the curved portion (60), the first wall (61) faces the second inner space (73) of the separator body (70) while the second wall (62) is exposed to the outside of the separator body (70). A high-temperature refrigerant flows in the second inner space (73) while the outside of the separator body (70) is in the atmospheric temperature atmosphere. Therefore, the second wall (62) has a temperature lower than that of the first wall (61). Oil droplets in the vicinity of the first wall (61) having a comparatively high temperature are thus easily flowable and easily moved by the centrifugal force toward the second wall (62). In contrast, the oil in the vicinity of the second wall (62) having a comparatively low temperature is cooled and is not easily flowable. Consequently, in the curved portion (60), the oil is easily collected at the second wall (62) or the outer circumferential portion (64), and the size of collected oil droplets tends to be large.

The oil whose oil droplets have a size thus increased in the curved portion (60) flows together with the refrigerant into the separator body (70). In the separator body (70), the refrigerant swirls in the second inner space (73). As a result, the oil droplets in the refrigerant are further separated by a centrifugal force. Here, the oil droplets in the refrigerant have a size increased when passing through the aforementioned curved portion (60). As a result, the centrifugal force that acts on the oil droplets increases, which improves oil separation efficiency.

The oil separated in the second inner space (73) is stored in the second oil reservoir (74). The refrigerant from which the oil has been separated flows upward in the inner passage (84) and is sent to the refrigerant circuit through the discharge pipe.

The aforementioned curved portion (60) includes the oil draining hole (90). It is thus possible to send a portion of the oil separated in the curved portion (60) directly into the second oil reservoir (74) through the oil draining hole (90) and the oil passage (92).

The oil draining hole (90) is formed in the outer circumferential portion (64) of the curved portion (60). Here, at the outer circumferential portion (64), the oil droplets moved by the centrifugal force are easily accumulated. The oil collected at the inner wall of the outer circumferential portion (64) is thus easily guided into the oil draining hole (90).

The oil draining hole (90) is formed in the lower-side portion (65) of the curved portion (60). The oil accumulated at the inner wall of the lower-side portion (65) is thus easily guided due to its own weight into the oil draining hole (90).

The outflow opening (93) of the oil passage (92) is formed in the outer cylinder (71). A distance between the outflow opening (93) and the inflow end of the inner passage (84) is thus sufficiently ensured. In addition, as illustrated in FIG. 8, the outflow opening (93) (axis (L3)) opens to be directed in the direction of the tangent (L4) of the outer cylinder (71), and the oil that has flowed out through the outflow opening (93) thus flows along the inner circumferential surface of the outer cylinder (71) into the second inner space (73). As a result, the oil that has flowed into the second inner space (73) from the oil passage (92) is avoided from following the flow of the refrigerant that moves toward the inner passage (84) and being sent together with the refrigerant into the discharge pipe.

The oil in the second oil reservoir (74) is sent into the first oil reservoir (18) through the oil outlet (75). The oil in the first oil reservoir (18) is sent into the bearing chamber (26) through the oil introduction path (17). The oil in the bearing chamber (26) lubricates a slidable portion of the second bearing (25). The oil in the bearing chamber (26) is also supplied to slidable portions of the compression mechanism (30) and the first bearing (24) through a predetermined passage (not illustrated).

—Action/Effect of Embodiment—

In the present embodiment, the outer cylinder (71) (peripheral wall) of the separator body (70) and the inflow pipe (50) have the first wall (61) (common portion (C)) common to each other. Consequently, it is possible to reduce the size of the oil separator (40), compared to a configuration with no common portion.

In the present embodiment, due to the curved portion (60) and the outer cylinder (71) being common to each other, it is possible to reduce the size of the oil separator (40) toward the inner side in the radial direction.

In the present embodiment, the first wall (61) faces the second inner space (73) of the separator body (70), and thus, the temperature of the curved portion (60) is easily increased on the side near the separator body (70). By utilizing such a temperature distribution, it is possible to collect oil droplets at the second wall (62) or the outer circumferential portion (64) of the curved portion (60) and accelerate accumulation of the oil.

In the present embodiment, the first wall (61) is substantially flush with the outer cylinder (71) (non-common portion) of the separator body (70). It is thus possible to simplify the shape of the outer cylinder (71), which makes it easy to mold the first unit including the outer cylinder (71). In addition, it is also possible to simplify a mold for casting.

In the present embodiment, the cross sectional shape at right angles to the pipe axis of the inner surface (61a) of the first wall (61) is flat. It is thus possible to increase the sectional area of the passage (63) of the curved portion (60). Consequently, the outer diameter (pipe diameter) of the curved portion (60) is enabled to be small, and it is thus to reduce the size of the oil separator (40).

In the present embodiment, the curved portion (60) includes the second wall (62) protruding from the peripheral wall (71) of the separator body (70) toward the outer side in the radial direction. The surface area of the second wall (62) exposed to the outside (atmosphere) of the separator body (70) is increased. Consequently, cooling of the oil near the second wall (62) is accelerated, which causes the oil to be easily collected at the inner surface of the second wall (62).

In the present embodiment, the axis (L1) of the inflow port (51a) of the inflow pipe (50) is offset from the tangent (L2) of the outer circumferential surface of the separator body (70) toward the axial center (center (P)) of the separator body (70). Due to this configuration, the inflow port (51a) of the inflow pipe (50) is positioned closer than radial-direction both ends of the separator body (70) to the center (P). Consequently, it is possible to reduce an installation space of the inflow pipe (50) and reduce the width of the discharge cover (41). In addition, due to this configuration, it is possible to increase the total length of the curved portion (60). As a result, it is possible to improve oil separation efficiency in the curved portion (60).

In the present embodiment, the separator body (70) and the inflow pipe (50) constitute an integral structure made of a cast, and it is thus possible to obtain the first wall (61) (common portion (C)) while molding the separator body (70) and the inflow pipe (50) easily. In addition, it is possible to suppress generation of vibrations and noises in the inflow pipe (50) because casts have a comparatively high vibration attenuation effect.

In particular, in the present embodiment, the separator body (70), the inflow pipe (50), and the discharge cover (41) constituting the integral structure enable a size reduction of the oil separator (40) and suppression of occurrence of vibrations and noises.

In the present embodiment, the curved portion (60) includes the oil draining hole (90), and it is thus possible to discharge the oil separated in the curved portion (60) to the outside of the curved portion (60). Here, in the curved portion (60), it is possible to send the oil into the oil draining hole (90) by utilizing the centrifugal force that acts on the oil. It is thus possible to carry the oil without utilizing a carrying source that carries the oil or a pressure difference.

In particular, in the present embodiment, the oil discharged from the oil draining hole (90) is sent into the second oil reservoir (74) of the separator body (70), and it is thus possible to shorten the oil passage (92) and the passage member (91) and suppress the oil from flowing out into the discharge pipe.

In the present embodiment, the separator body (70), the inflow pipe (50), and the passage member (91) constituting the integral structure enables a size reduction of the oil separator (40).

In the present embodiment, the oil separator (40) constitutes a portion of the casing (11). It is thus possible to reduce the size of the compressor (10).

MODIFICATIONS OF EMBODIMENT

The aforementioned embodiment may be configured into the following modifications.

First Modification

Figure 9:
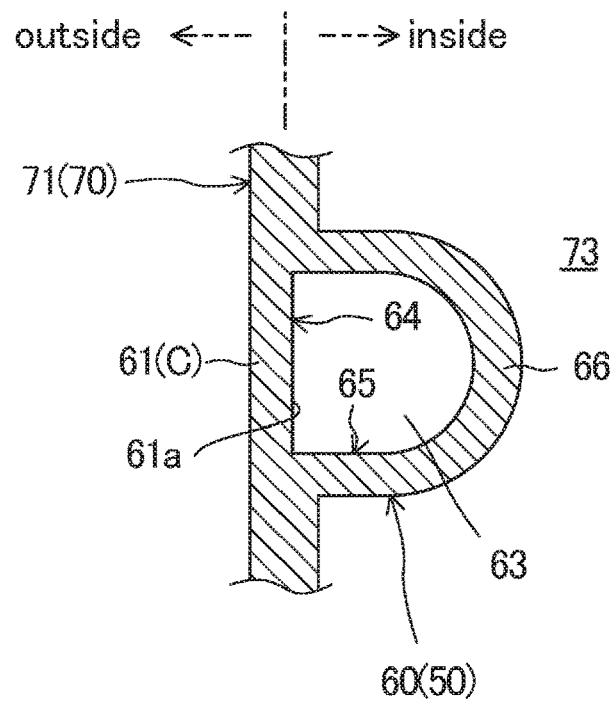
FIG. 9 relates to a first modification and corresponds to FIG. 6.

A first modification illustrated in FIG. 9 differs from the aforementioned embodiment in terms of the configuration of the curved portion (60). The curved portion (60) of the first modification does not include the second wall (62) and includes a third wall (66) that protrudes from the outer cylinder (71) or the first wall (61), which is the common portion (C), toward the inner side in the radial direction.

In the present modification, a portion of the curved portion (60) is positioned closer than the outer cylinder (71) to the center of the separator body (70). The curved portion (60) thus does not project toward the outer side in the radial direction with respect to the separator body (70), and it is thus possible to reduce the radial-direction size of the oil separator (40).

Second Modification

Figure 10:
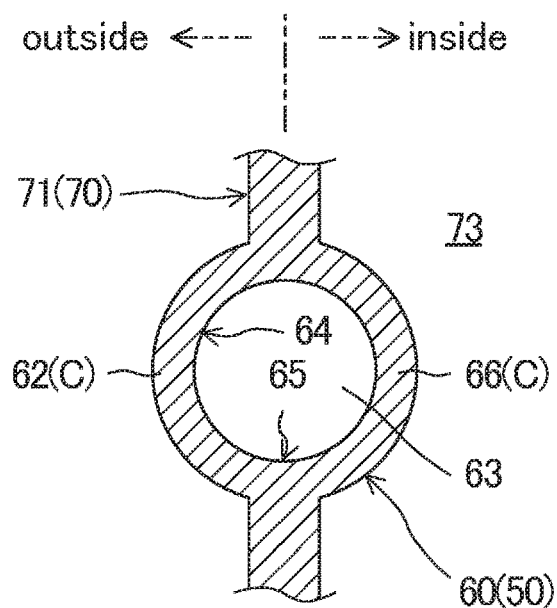
FIG. 10 relates to a second modification and corresponds to FIG. 6.

A second modification illustrated in FIG. 10 differs from the aforementioned embodiment in terms of the configuration of the curved portion (60). The curved portion (60) of the second modification does not include the first wall (61), and the second wall (62) protrudes from the outer cylinder (71) toward the outer side in the radial direction and the third wall (66) protrudes from the outer cylinder (71) toward the inner side in the radial direction. In the second modification, one of or both of the second wall (62) and the third wall (66) can be considered the common portion (C) common between the curved portion (60) and the outer cylinder (71).

Third Modification

Figure 11:
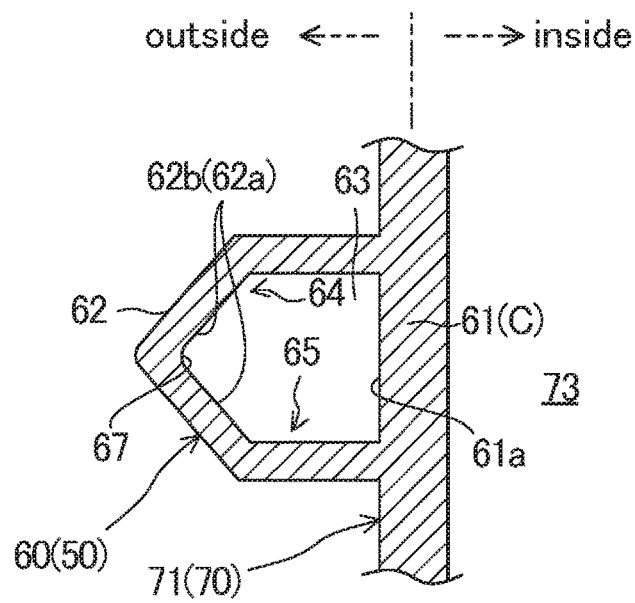
FIG. 11 relates to a third modification and corresponds to FIG. 6.

A third modification illustrated in FIG. 11 differs from the aforementioned embodiment in terms of the shape of the second wall (62). An inner surface (62a) of the second wall (62) of the third modification has a shape tapered toward the outer side in the radial direction in the cross sectional view thereof at right angles to the pipe axis. Specifically, the curved portion (60) of the third modification has a polygonal (pentagonal shape in the present modification) sectional shape. The second wall (62) has two surfaces (62b, 62b) close to the outer side, and the interval between the two surfaces decreases toward the outer side in the radial direction. Consequently, the second wall (62) includes, in a front end portion on the outer side in the radial direction, a groove (67) that catches an oil.

In the curved portion (60) of the third modification, oil droplets that have moved toward the outer side in the radial direction due to a centrifugal force enter and is accumulated in the groove (67) of the second wall (62). As a result, it is possible to improve oil separation efficiency.

The groove (67) of the curved portion (60) of the third modification may include the aforementioned oil draining hole (90). The oil that flows in the groove (67) is thereby enabled to flow into the oil draining hole (90).

Fourth Modification

Figure 12:
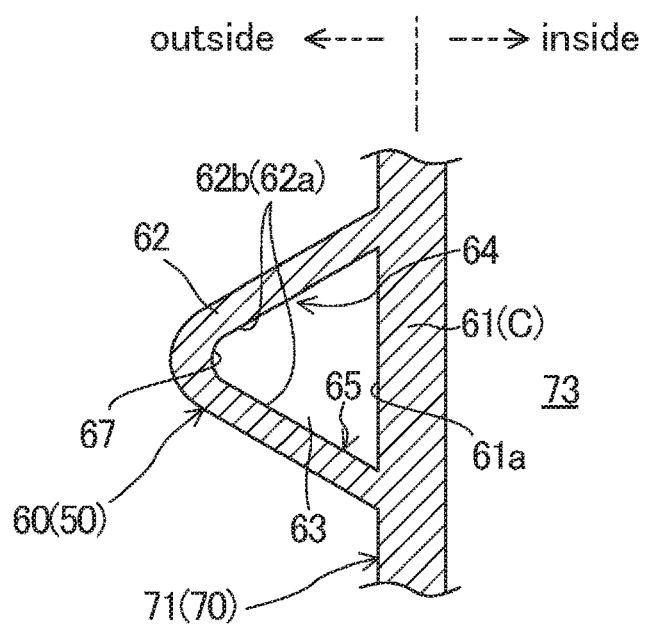
FIG. 12 relates to a fourth modification and corresponds to FIG. 6.

The curved portion (60) of the fourth modification illustrated in FIG. 12 has a triangular sectional shape. As with the third modification, the inner surface (61a) of the second wall (62) of the curved portion (60) has a shape tapered toward the outer side in the radial direction in the cross sectional view thereof at right angles to the pipe axis. The second wall (62) includes two surfaces (62b, 62h) close to the outer side, and the interval between the two surfaces decreases toward the outer side in the radial direction. Consequently, the second wall (62) includes, in the front end portion on the outer side in the radial direction, the groove (67) that catches an oil.

The groove (67) of the curved portion (60) of the fourth modification may include the aforementioned oil draining hole (90). The oil that flows in the groove (67) is thereby enabled to flow into the oil draining hole (90).

Fifth Modification

Figure 13:
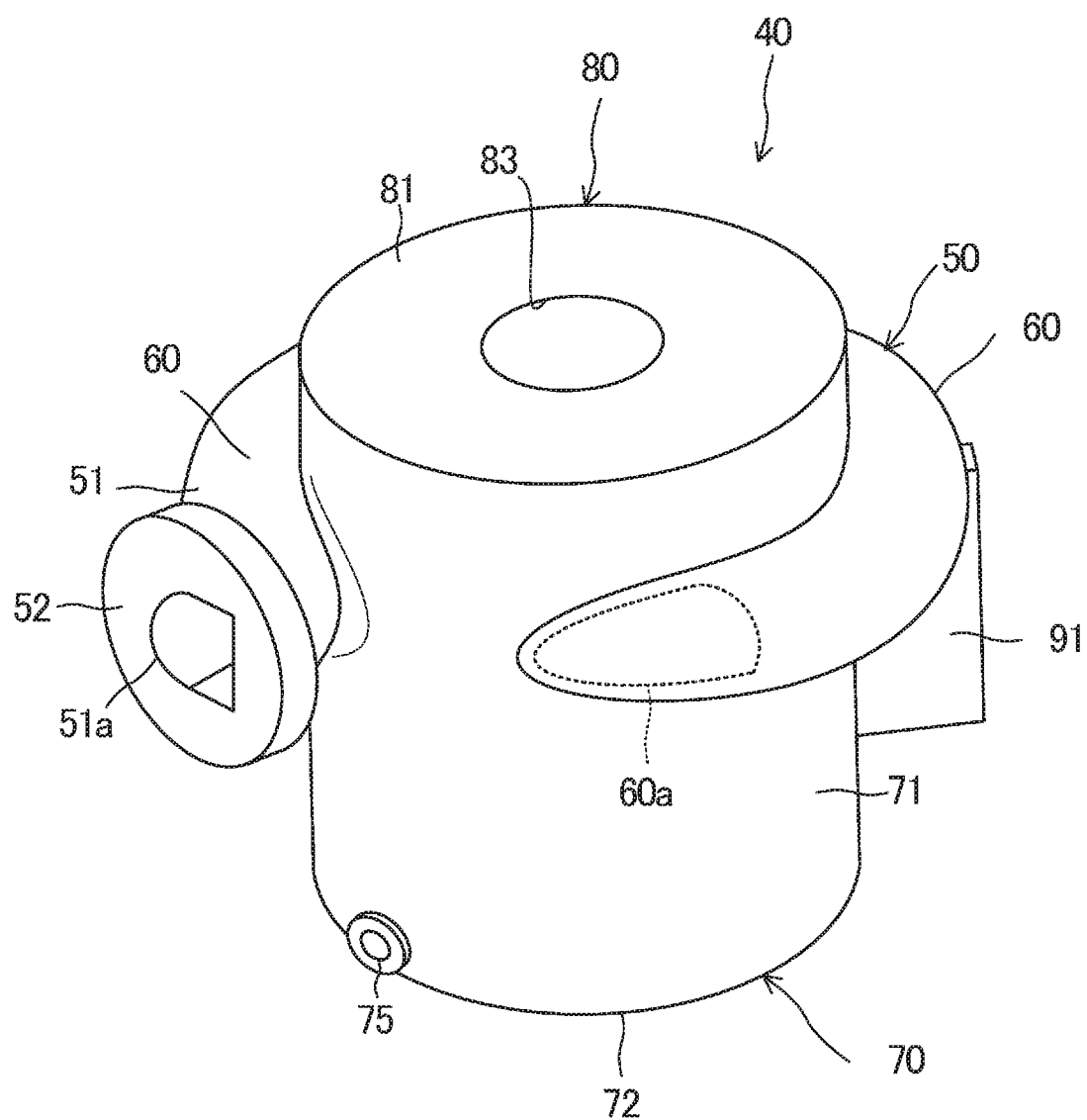
FIG. 13 is a perspective view of an oil separator according to a fifth modification.

A fifth modification illustrated in FIG. 13 differs from the aforementioned embodiment in terms of the structure of the oil separator (40). The oil separator (40) of the fifth modification does not include the discharge cover (41) that is also used for the casing (11) of the compressor (10). At the starting end of the inflow pipe (50) of the oil separator (40), a pipe flange (52) connectable to the other pipe is formed. The pipe flange (52) is coupled to an outflow pipe (not illustrated) through which a refrigerant discharged from the compression mechanism (30) flows out.

The separator body (70) of the fifth modification includes the oil outlet (75), as with the aforementioned embodiment. A pipe for sending an oil to a predetermined supply destination is directly connected to the oil outlet (75).

Sixth Modification

Figure 14:
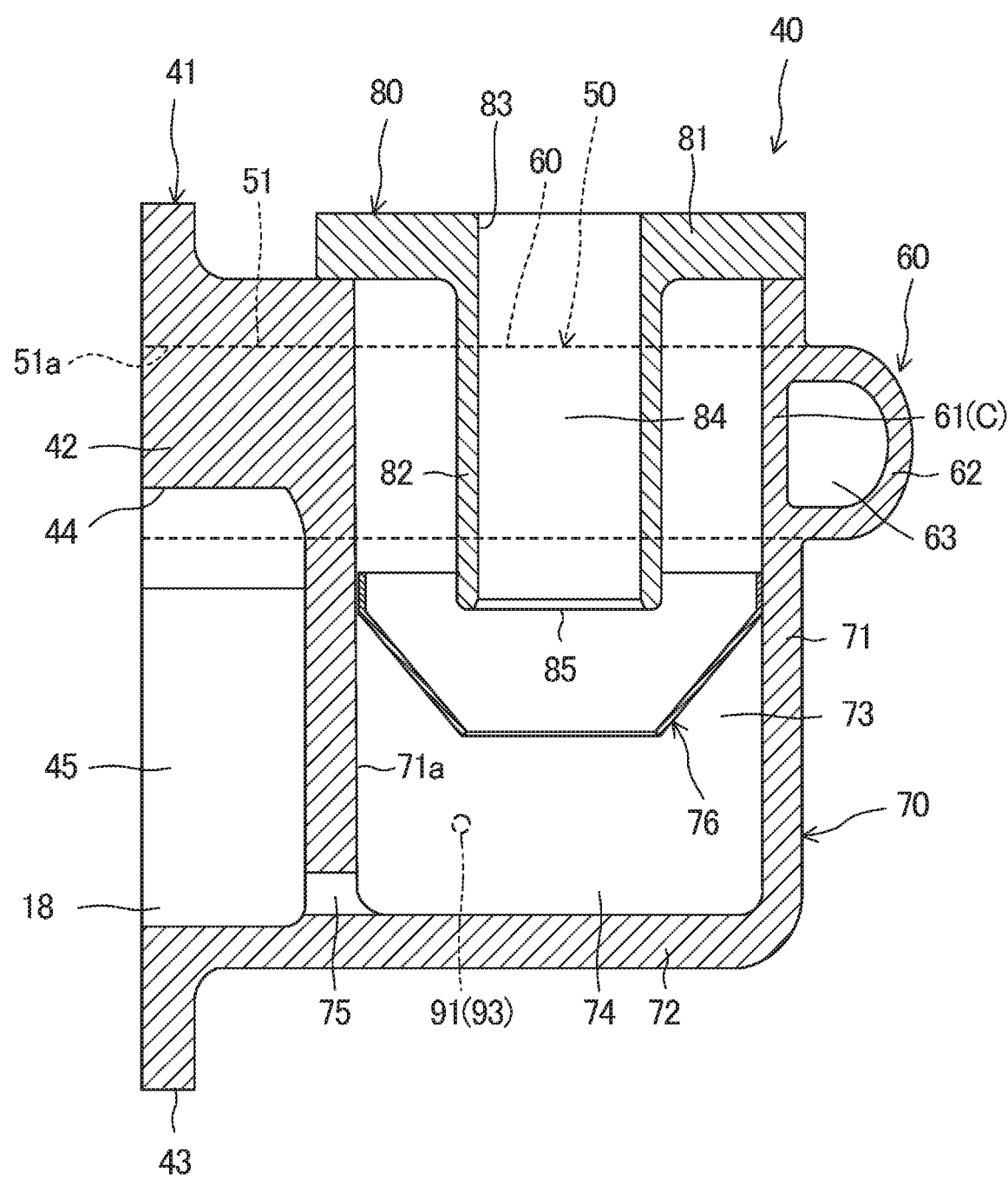
FIG. 14 is a view of an oil separator according; to a sixth modification and corresponds to FIG. 4.

A sixth modification illustrated in FIG. 14 includes a separation plate (76) inside the separator body (70). The separation plate (76) has a substantially conical cylinder shape whose inner diameter decreases toward the lower side. The upper end of the separation plate (76) is supported by the outer cylinder (71). The lower end of the separation plate (76) includes a circular opening. The separation plate (76) suppresses the oil in the second oil reservoir (74) from flowing into the inside of the inner cylinder (82).

The outflow opening (93) of the oil passage (92) is positioned on the lower side of the separation plate (76). Consequently, it is possible to suppress the oil that has flowed out through the outflow opening (93) from flowing into the inside of the inner cylinder (82).

Seventh Modification

Figure 15:
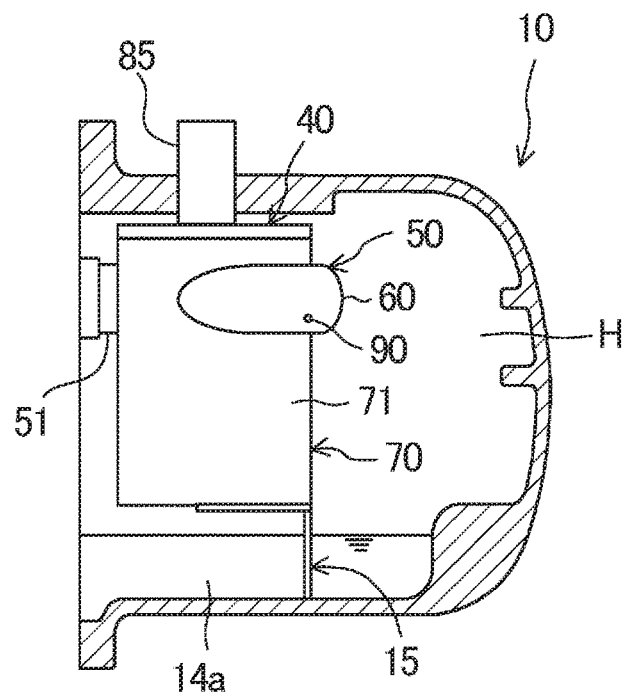
FIG. 15 is a longitudinal sectional view of a compressor according to a seventh modification, illustrating the periphery of an oil separator in an enlarged manner.

In a seventh modification illustrated in FIG. 15, the oil separator (40) is accommodated inside the casing (11) of the compressor (10). The oil separator (40) is accommodated inside the discharge cover (14) of the casing (11). The discharge cover (14) is configured to be a different body from the oil separator (40) and closes a high-pressure-side opening portion of the aforementioned casing body (11). Inside the discharge cover (14), the high-pressure space (H)

filled with a high-pressure refrigerant is formed. An oil reservoir (14a) is formed on the lower side of the discharge cover (14).

The oil separator (40) is supported on the upper side of the oil reservoir (14a) by, for example, a support (15). As with the aforementioned embodiments, the high-pressure refrigerant compressed in the compression mechanism (30) flows into the separator body (70) after flowing through the curved portion (60) of the inflow pipe (50). The fluid inside the separator body (70) is sent to the refrigerant circuit through a discharge pipe (85).

In the seventh modification, as with the aforementioned embodiment, the curved portion (60) includes the oil draining hole (90). The oil draining hole (90) enables the inside of the curved portion (60) and the outside of the curved portion (60) to be directly in communication with each other. Thus, the oil that has flowed out through the oil draining hole (90) of the curved portion (60) drops downward due to its own weight and is collected directly in the oil reservoir (14a). As with the aforementioned embodiment, the oil in the oil reservoir (14a) is utilized, through a predetermined oil introduction path, for lubrication of the compression mechanism (30) and the bearings (24, 25). The oil draining hole (90) of the curved portion (60) may employ any of the configurations of the aforementioned embodiments.

OTHER EMBODIMENTS

Figure 16:
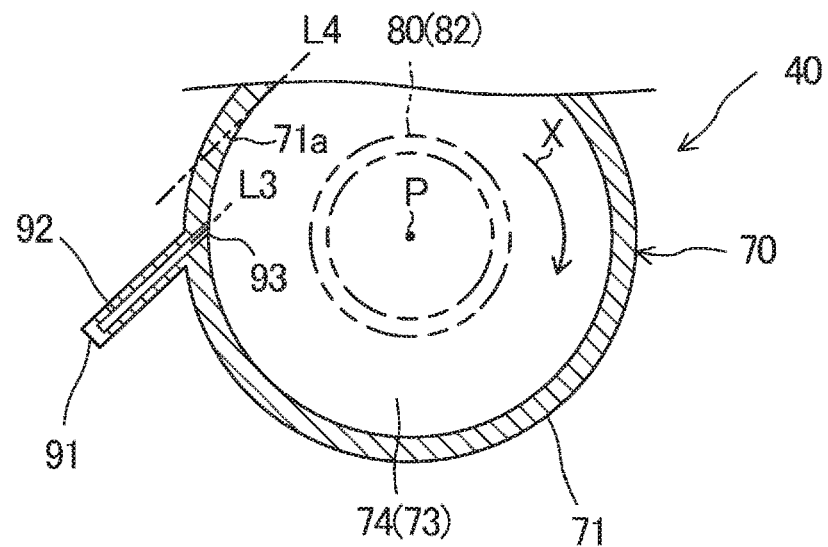
FIG. 16 is a view of the other embodiment and corresponds to FIG. 8.

As illustrated in FIG. 16, the axis (L3) of the outflow opening (93) of the oil passage (92) is not limited to being coincident with the tangent (L4) of the inner circumferential surface (71a) of the outer cylinder (71). Specifically, while the outflow opening (93) opens in the direction along the tangent (L4), the axis (L3) thereof may be offset from the tangent (L4) toward the center (P). The outflow opening (93) may open in the normal direction to be directed to the center (P).

The oil separator (40) may be configured such that the straight portion (51) of the inflow pipe (50) and the separator body (70) include the common portion (C) common to each other. In this configuration, the separator body (70) and a portion of the inflow pipe (50) are also used in common, and it is thus possible to reduce the size of the oil separator (40).

As long as being of a centrifugal type that separates an oil inside the separator body (70) by utilizing a centrifugal force, the oil separator (40) may have any configurations and may be configured not to include the inner cylinder (82).

The oil collected in the second oil reservoir (74) may be sent directly into the bearing chamber (26) or may be supplied to the slidable portions of the compression mechanism (30) and the like without passing through the bearing chamber (26). The oil in the second oil reservoir (74) may be returned in the middle of compression (intermediate pressure part) of the compression chamber (35).

Similarly, the oil drained through the oil draining hole (90) may be sent directly into the bearing chamber (26) or may be supplied to the slidable portions of the compression mechanism (30) and the like without passing through the bearing chamber (26). The oil drained through the oil draining hole (90) may be returned in the middle of compression (intermediate pressure part) of the compression chamber (35).

The compressor (10) may be a twin-screw compressor including two screws or may be a one-gate-type single-screw compressor including one gate rotor.

The compressor (10) may employ, as an alternative to a screw type, other types, such as a rotary type, a swing type, a scroll type, and a turbo type.

The refrigeration apparatus may be an air-conditioning apparatus that performs indoor air-conditioning, a cooler that cools air in a storage chamber, a heat pump-type hot water heater, and the like.

The oil separator (40) may be applied to apparatuses other than the compressor (10) and a refrigeration apparatus provided that the use thereof is to separate an oil from a fluid.

What is claimed is:

1. An oil separator, the oil separator being a centrifugal-separation type, the oil separator comprising:
   a cylindrical separator body; and
   an inflow pipe arranged to introduce a fluid including an oil into the separator body, the inflow pipe including a curved portion,
   a peripheral wall of the separator body and the inflow pipe including a common portion common to each other,
   the common portion being disposed in the curved portion of the inflow pipe, and
   an axis of an inflow port of the inflow pipe being offset from a tangent of an outer circumferential surface of the separator body toward a center of the separator body, the tangent being at a point on the outer circumferential surface of the separator body separating an inner space of the separator body from a passage of the curved portion, the passage being disposed externally of the outer circumferential separator body, the axis of the inflow port of the inflow pipe passing through the inner space of the separator body, the tangent being parallel to the axis of the inflow port of the inflow pipe.

2. The oil separator according to claim 1, wherein
   the curved portion includes a first wall as the common portion, the first wall being substantially flush with the peripheral wall of the separator body.

3. The oil separator according to claim 2, wherein
   a shape of a cross section of an inner surface of the first wall is flat, and the cross section is at right angles to an axis of the inflow pipe.

4. The oil separator according to claim 1, wherein
   the curved portion includes a second wall protruding from the peripheral wall of the separator body toward an outer side in a radial direction.

5. The oil seperator according to claim 1, wherein the separator body and a the inflow pipe form an integral cast structure.

6. The oil separator according to claim 1, wherein the curved portion has an inner surface having a shape tapered toward an outer side in radial direction.

7. The oil separator according to claim 1, wherein the curved portion includes an oil draining hole.

8. The oil separator according to claim 7, further comprising:
   a passage member forming an oil passage in communication with the oil draining hole,
   the passage member having a structure integral with at least one of the curved portion and the separator body.

9. A compressor including the oil separator according to claim 1, the compressor further comprising:
   a compression mechanism configured to compress a fluid, the oil separator being targeted at a fluid discharged from the compression mechanism.

10. The compressor according to claim 9, further comprising:
a casing that accommodates the compression mechanism,
the oil separator forming a portion of the casing.

11. An oil separator, the oil separator being a centrifugal-separation type, the oil separator comprising;
a cylindrical separator body; and
an inflow pipe arranged to introduce a fluid including an oil into the separator body, the inflow pipe including a curved portion,
a peripheral wall of the separator body and the inflow pipe including a common portion common to each other,
the common portion being disposed in the curved portion of the inflow pipe,
an axis of an inflow port of the inflow pipe being offset from a tangent of an outer circumferential surface of the separator body toward a center of the separtor body, the tangent being parallel to the axis of the inflow port of the inflow pipe, and
the curved portion including a second wall protruding from the peripheral wall of the separator body toward an outer side in a radial direction.

12. An oil separator, the oil separator being a centrifugal-separation type, the oil separator comprising:
a cylindrical separator body; and
a tangential inflow pipe arranged to introduce a fluid including an oil into the separator body, the inflow pipe including a curved portion to impart a swirl to the fluid to facilitate separating the oil with a centrifugal force,
a peripheral wall of the separator body and the inflow pipe including a common portion common to each other, and
the curved portion including an oil draining hole.

13. The oil separator according to claim 12, further comprising:
a passage member forming an oil passage in communication with the oil draining hole,
the passage member having a structure integral with at least one of the curved portion and the separator body.

* * * * *